(12) United States Patent
Hemphill et al.

(10) Patent No.: US 9,229,886 B2
(45) Date of Patent: Jan. 5, 2016

(54) MANAGEMENT DATA TRANSFER BETWEEN PROCESSORS

(75) Inventors: John M. Hemphill, Spring, TX (US); Thomas J. Bonola, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 254 days.

(21) Appl. No.: 13/583,020

(22) PCT Filed: Apr. 30, 2010

(86) PCT No.: PCT/US2010/033152
§ 371 (c)(1),
(2), (4) Date: Sep. 6, 2012

(87) PCT Pub. No.: WO2011/136796
PCT Pub. Date: Nov. 3, 2011

(65) Prior Publication Data
US 2012/0331192 A1    Dec. 27, 2012

(51) Int. Cl.
*G06F 13/42* (2006.01)
*G06F 13/24* (2006.01)
*G06F 13/16* (2006.01)

(52) U.S. Cl.
CPC .................................. *G06F 13/1652* (2013.01)

(58) Field of Classification Search
USPC .......................... 710/105, 315, 316, 260–269
See application file for complete search history.

(56) References Cited

U.S. PATENT DOCUMENTS

| | | | | |
|---|---|---|---|---|
| 4,276,594 A * | 6/1981 | Morley | ................. | G06F 13/124 713/600 |
| 4,298,928 A * | 11/1981 | Etoh et al. | ....................... | 710/29 |
| 4,354,262 A * | 10/1982 | Guezou et al. | ................. | 370/363 |
| 4,905,145 A * | 2/1990 | Sauber | ..................... | G06F 13/36 712/28 |
| 5,142,683 A * | 8/1992 | Burkhardt, Jr. | ........ | G06F 13/128 709/215 |
| 5,179,669 A * | 1/1993 | Peters | ........................... | 710/317 |
| 5,251,302 A * | 10/1993 | Weigl et al. | .................... | 710/263 |
| 5,349,644 A * | 9/1994 | Massey et al. | ................. | 706/10 |
| 5,584,027 A | 12/1996 | Smith | | |
| 5,819,087 A * | 10/1998 | Le | ......................... | G06F 9/4401 710/10 |
| 5,867,658 A * | 2/1999 | Lee | ............................... | 709/222 |
| 6,088,788 A * | 7/2000 | Borkenhagen | ........ | G06F 9/3824 711/140 |
| 6,092,124 A * | 7/2000 | Priem et al. | ..................... | 710/23 |
| 6,154,793 A * | 11/2000 | MacKenna et al. | ............ | 710/23 |
| 6,212,628 B1 * | 4/2001 | Abercrombie | ...... | G06F 9/30014 712/16 |
| 6,256,699 B1 * | 7/2001 | Lee | ............................... | 710/310 |

(Continued)

FOREIGN PATENT DOCUMENTS

| | | |
|---|---|---|
| CN | 1137442 C | 2/2004 |
| KR | 1020070057442 | 6/2007 |

OTHER PUBLICATIONS

International Searching Authority, The International Search Report and the Written Opinion, Dec. 28, 2010, 10 pages.

(Continued)

*Primary Examiner* — Faisal M Zaman
(74) *Attorney, Agent, or Firm* — Van Cott, Bagley, Cornwall & McCarthy

(57) ABSTRACT

A method for transferring management data between processors over an Input/Output (I/O) bus system (232) includes receiving the management data at a managing processor (212) from a managed host processor (202) over the I/O bus system; and storing the management data in an addressable memory (304) of an I/O bus interface device (218) of the managing processor (212).

9 Claims, 6 Drawing Sheets

(56) References Cited

U.S. PATENT DOCUMENTS

| | | | |
|---|---|---|---|
| 6,269,415 B1* | 7/2001 | Hirabayashi et al. | 710/301 |
| 6,493,347 B2* | 12/2002 | Sindhu et al. | 370/401 |
| 6,678,801 B1* | 1/2004 | Greim | G06F 12/0692 710/305 |
| 6,691,193 B1* | 2/2004 | Wang et al. | 710/200 |
| 6,751,698 B1* | 6/2004 | Deneroff et al. | 710/317 |
| 6,785,892 B1* | 8/2004 | Miller et al. | 719/313 |
| 7,035,957 B2 | 4/2006 | Ishiwata | |
| 7,039,918 B2 | 5/2006 | Jones et al. | |
| 7,080,264 B2 | 7/2006 | Mahony et al. | |
| 7,233,977 B2* | 6/2007 | Gupta | G06F 15/167 709/216 |
| 7,389,367 B2 | 6/2008 | Baba | |
| 7,400,033 B1 | 7/2008 | Cheah et al. | |
| 7,466,713 B2 | 12/2008 | Saito | |
| 8,327,137 B1* | 12/2012 | Erb et al. | 713/164 |
| 2002/0091826 A1* | 7/2002 | Comeau | G06F 9/546 709/226 |
| 2004/0177205 A1* | 9/2004 | Schoner | 710/305 |
| 2004/0215857 A1* | 10/2004 | Takeuchi et al. | 710/113 |
| 2004/0225760 A1* | 11/2004 | Lee | 710/22 |
| 2005/0038945 A1* | 2/2005 | Himmel et al. | 710/300 |
| 2005/0097233 A1* | 5/2005 | Oka et al. | 710/9 |
| 2005/0154927 A1* | 7/2005 | Chen et al. | 713/300 |
| 2006/0193317 A1* | 8/2006 | Rajagopalan et al. | 370/389 |
| 2007/0162671 A1* | 7/2007 | Seo | 710/110 |
| 2007/0180182 A1* | 8/2007 | Gostin et al. | 710/317 |
| 2007/0204091 A1* | 8/2007 | Hofmann et al. | 710/308 |
| 2007/0288675 A1* | 12/2007 | Matsuyama | 710/240 |
| 2008/0084886 A1* | 4/2008 | Cooley | 370/395.5 |
| 2008/0157350 A1 | 7/2008 | Cheah | |
| 2008/0162706 A1* | 7/2008 | Tailor et al. | 709/228 |
| 2008/0222223 A1* | 9/2008 | Srinivasan et al. | 707/205 |
| 2009/0024723 A1 | 1/2009 | Reyes et al. | |
| 2009/0089487 A1* | 4/2009 | Kwon | G06F 12/0851 711/103 |
| 2009/0144476 A1* | 6/2009 | Cai et al. | 710/302 |
| 2009/0259861 A1* | 10/2009 | Tune | 713/320 |
| 2010/0045682 A1 | 2/2010 | Ford et al. | |
| 2011/0093690 A1* | 4/2011 | Vyssotski et al. | 713/2 |
| 2015/0019923 A1* | 1/2015 | Michels et al. | 714/718 |

OTHER PUBLICATIONS

National Instruments, Data Streaming Architectures in PXI Systems, 29 Jan. 1-15, 2010, http://zone.ni.com/devzone/cda/tut/p/id/3221#toc5.

"Data management for large-scale scientific computations in high performance distributed systems",. Choudhary, et al. Cluster Computing, vol. 1, No. 3, 2000, pp. 45-60.

"Implementing advanced timing and synchronization architectures in PXI systems", Spencer Stock, Autotestcom, 2005. IEEE, pp. 862-867.

"Unleashing the Power of iLO, IPMI and Other Service Processors"; http://www.avocent.com/assets/0/2319/2343/2465/2470/12ff0a27-dd83-4a1a-9ec6-fdc849b89ed8.pdf, Retrieved Apr. 30, 2010, 28 Pages.

* cited by examiner

MANAGEMENT DATA TRANSFER BETWEEN PROCESSORS

BACKGROUND

As the demand for faster processing power increases, many system developers are making use of multi-processor systems. A multi-processor system is one that includes more than one central processing unit. A processing unit also referred to as a processor, is responsible for executing computer programming and thus performs a computing system's primary functions. Having more than one processor in a system may allow the system to process tasks at a faster rate, A typical multi-processor system includes a managing processor and a number of managed host processors. The managing processor may receive information from the managed host processors relating to their configuration, operation, and performance.

This type of information may be very useful to a management entity such as a central management system. A central management system may be configured to interface with and manage the operating systems of several different computing and networking systems. Having management information related to the many processors within a system, a management entity may make more effective use of the various processing resources available.

Data transfer between a managing processor and a managed host processor is typically done through a one-wire serial communication bus. The managing processor typically includes a master bus station for polling a slave bus station on a managed host processor. Upon being polled the managed host processor sends the appropriate management data. However, this process is relatively slow compared to the speed at which many processors are able to execute instructions. Thus, by the time the management data from the managed processor in response to the poll reaches the managing processor, it may be outdated and of little use.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical elements.

DETAILED DESCRIPTION

Figure 1:
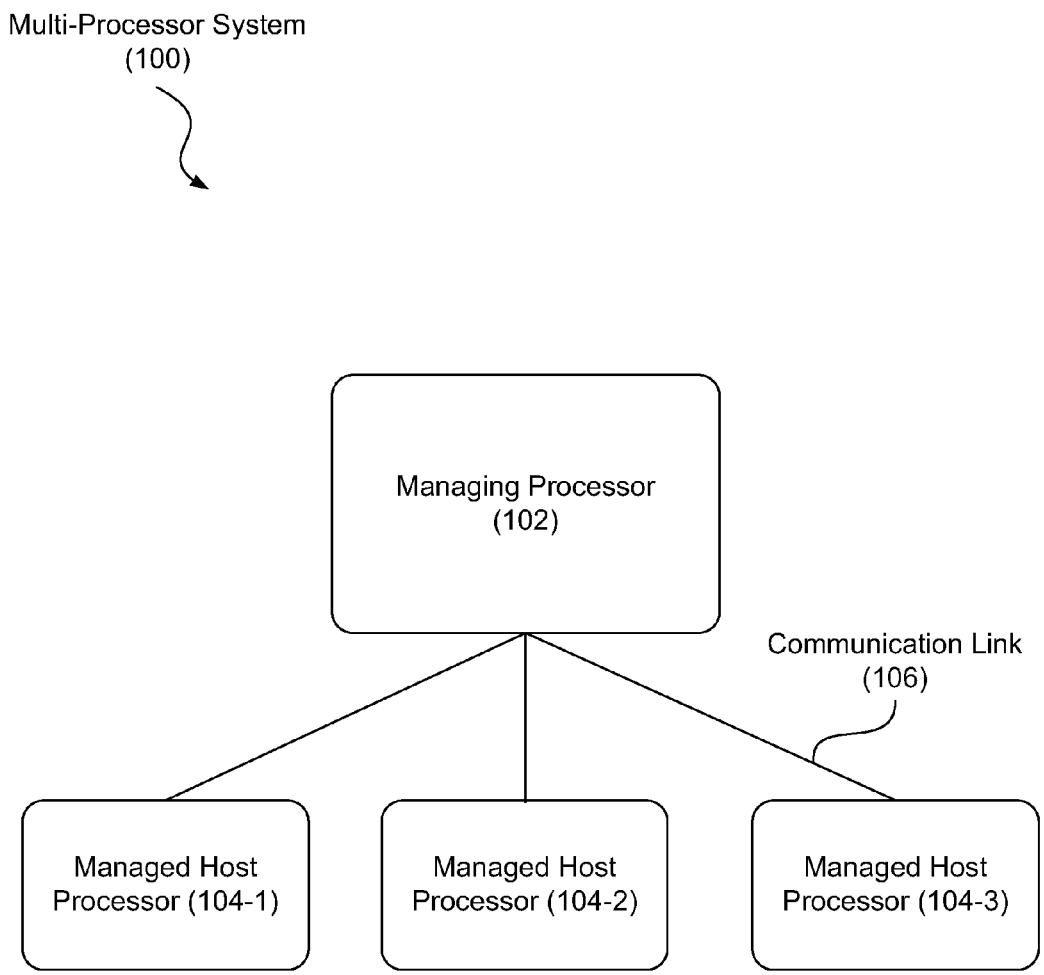
FIG. 1 is a diagram showing an illustrative multi-processor system, according to one embodiment of principles described herein.

As mentioned above, the transfer of management data between a managing processor and a managed host processor is typically done through a one-wire serial communication bus. This process is relatively slow compared to the speed at which many processors are able to execute instructions. This slow process may be due to the signaling speed of the communication bus and the communication protocols used. Thus, by the time the management data reaches the managing processor, it may be outdated. Outdated management data may not be of much use to the managing: processor or a larger management entity that communicates with or incorporates the managing processor, such as a central management system.

In light of this and other issues, the present specification relates to methods and systems for transferring management data between two processors. According to certain illustrative embodiments, a managing processor and a managed host processor may be connected to an Input/Output (I/O) bus system. Within this I/O bus system, a direct communication bus may run from the managing processor to the managed host processor. The managing processor may use the direct communication bus to send a memory location to the managed host processor. The memory location may be part of a memory address space within an I/O device interface of the managing processor. The memory location may indicate where the managed host processor should send management data for the managing processor. The managed host processor may then send management data over the I/O bus system to the proper memory location indicated by the managing processor. The management data may then be processed by the managing processor and sent to a management entity.

Through use of a method or system embodying principles described herein, a managing processor may receive management data from a managed host processor at a rapid rate, allowing the managing processor to have up-to-date management data for the managed host processor. This management data may be passed on to a management entity such as a central management system which may be able to effectively use the management data to manage a plurality of computer systems. Additionally, the managing processor need not wait until a scheduled time to receive updated management data. The managed host processor may send management data in response to a change of state at any time.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Referring now to the figures, FIG. 1 is a diagram showing an illustrative multi-processor system. According to certain illustrative embodiments, a multi-processor system (100) may include a managing processor (102) and a number of managed host processors (104-1, 104-2, 104-3). The managing processor (102) may communicate with the managed host processors (104-1, 104-2, 104-3) over a communication link (106). In a system that includes multiple host processors (104), a managing processor (102) is typically used to manage the communication of data between the host processors (104) and a larger managing entity.

Figure 2:
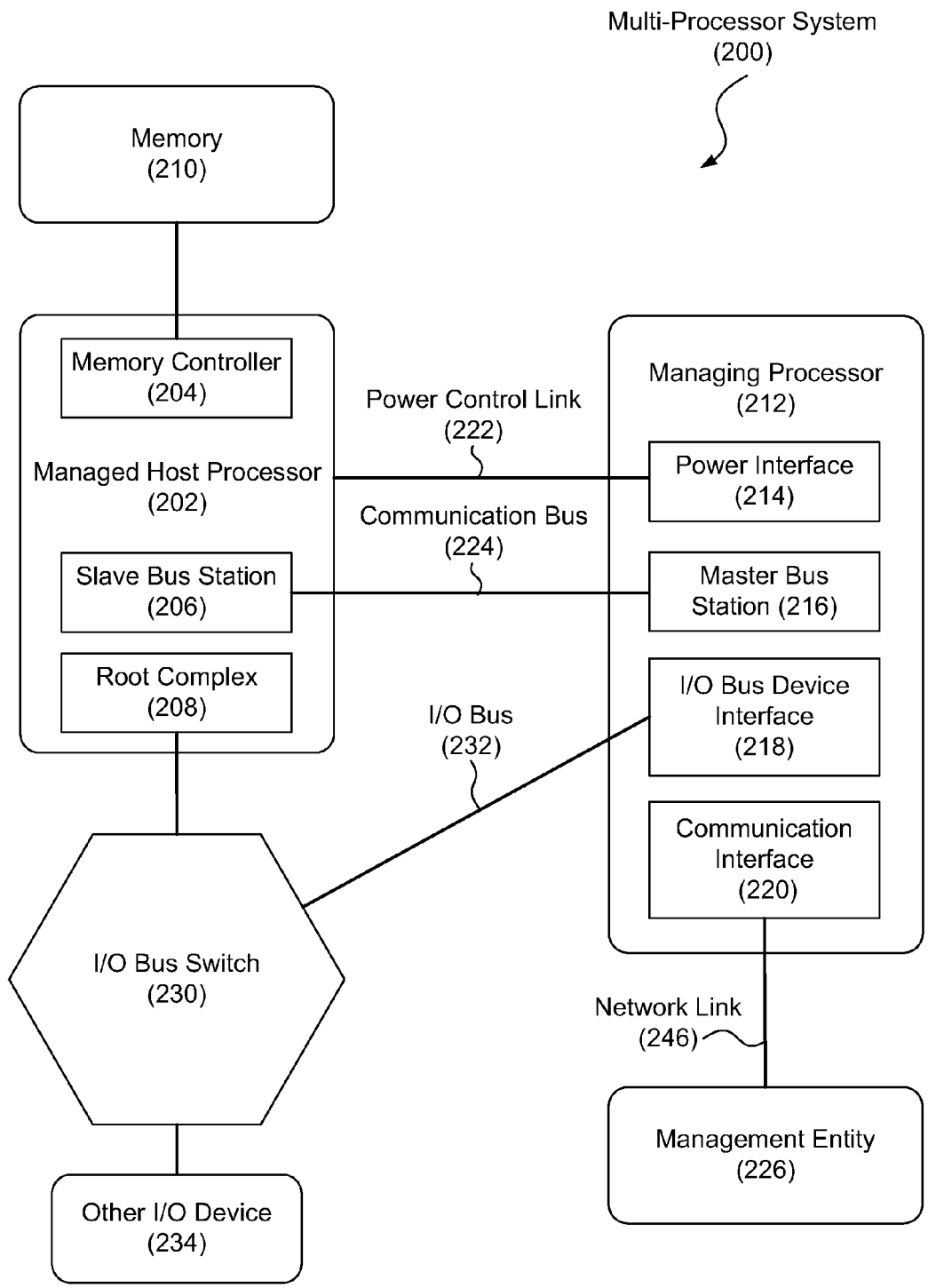
FIG. 2 is a diagram showing an illustrative multi-processor system in greater detail, according to one embodiment of principles described herein.

FIG. 2 is a diagram showing an illustrative multi-processor system (200) in greater detail. According to certain illustrative embodiments, a managing processor (212) may be communicatively coupled to a managed host processor (202) through a communication bus (224) and a power control link (222).

The managing processor (212) may also be connected to the host processor (202) through an I/O bus system. The I/O bus system may include a number of I/O bus lines (232) and I/O bus switches (230).

As mentioned above, a typical multi-processor system (200) includes a managing processor (212). The managing processor (212) may be used to manage the flow of data between a number of host processors (e.g., 202) and possibly other peripheral components. According to certain illustrative embodiments, a managing processor (212) may include a power interface (214), a master bus station (216), an I/O bus device interface (218), and a communication interface (220).

A managing processor (212) may have the capability of controlling the power being supplied to the managed host processors (202). A power interface (214) may allow the managing processor (212) to power on or power off a managed host processor (e.g., 202) via a power control link (222). For example, if a particular managed host processing unit is not being used, it may be powered down to conserve energy until it is needed again. The managing processor (212) may power on a host processing unit when the host processing unit is required for various processing tasks as directed by a management entity (226).

As mentioned above, a typical way for a managing processor (212) to receive management data from a host processor (e.g., 202) is for a master bus station (218) of the managing processor (212) to poll a slave bus station (206) on a managed host processor (202). The host processor (202) may then send the requested data back to the managing processor (212) over the serial communication bus (224). This process is relatively slow as the serial communication bus (224) is not designed for high bandwidth data transfer. Additionally, the managed host processor (202) may only send management data to the managing processor (212) when polled. Thus, the managed host processor (202) may have no way of alerting the managing processor (212) to a change of its state or configuration.

In order to provide a managing processor (212) and thus a management entity (226) with up-to-date management data from the host processors (e.g., 202), the present specification discloses a method for providing management data to the managing processor (212) over a faster connection.

As indicated above, a managing processor typically includes an I/O bus device interface (218) configured to use an I/O bus system (232, 230). An I/O bus system (232, 230) provides a means of transferring data between multiple devices. Data may be transferred over bus lines and routed from a source to a proper destination based on the system configuration. One example of such an I/O bus system is a Peripheral Component Interconnect (PCI) express bus system.

The managing processor (212) may include an I/O bus device interlace (218) for the purpose of managing the flow of data over the I/O bus system (232, 230). Additionally, other devices along the I/O bus system may include their own I/O bus device interfaces or similar components used to interact with other devices along the I/O bus system.

An I/O bus may be used to transfer data to many different types of peripheral devices. An I/O bus switch (230) may be used to route the flow of data over multiple I/O bus lines (e.g., 232). An I/O bus line may be made of several parallel wires, each wire carrying a bit of information at a time. In some embodiments, an I/O bus line may include one wire which may carry only one bit at a time in a serial fashion. Some serial bus lines may be designed to transfer data at very high rates. Despite the type of bus line, an I/O switch (230) may be configured to route the flow of information between I/O bus device interfaces (218) of the various components using an I/O bus (232).

As mentioned above, management, data may be relayed to a management entity (228) such as a central management system. Consequently, the managing processor (212) may include a communication interface (220) to communicate data over a network link (248) to a management entity (226). The network link (248) may be any suitable communication link for transferring data between the managing processor (212) and the management entity (226).

The managed host processors (e.g., 202) of a multi-processor system (200) may be responsible for performing the main processing tasks required by the system. According to certain illustrative embodiments, a managed host processor (e.g., 202) may include a memory controller (204), a slave bus station (206) and a root complex (208).

The managed host processor (202) uses a memory controller (204) to communicate with system memory (210). Typical system memory (210) includes several levels of memory, including but not limited to, processor registers, processor cache, main memory and non-volatile memory, that will each be described below. For example, after data is processed by the processor (202), it may be placed into one of the processors registers. A typical processor includes a number of registers in which to hold data for quick access by the processor. From the registers, the data may be moved to a processor cache. Some processors may include several levels of processor cache. From the processor cache data may be moved into main memory. The processor registers, processor cache, and main memory are generally made of volatile memory modules. Volatile memory modules do not hold their data when powered down. From main memory, some data may be moved to a non-volatile memory storage unit such as a hard disk drive or a solid-state drive.

A root complex (208) may be used to connect a host processor (202) to the I/O bus system (230, 232). The root complex (208) may initiate the transfer of data between the processor and other devices along the I/O bus system. In some embodiments, the root complex (208) may be integrated with a processor (202). In some cases, the root complex (208) may be designed as a device which is separate from the processor (202).

Figure 3:
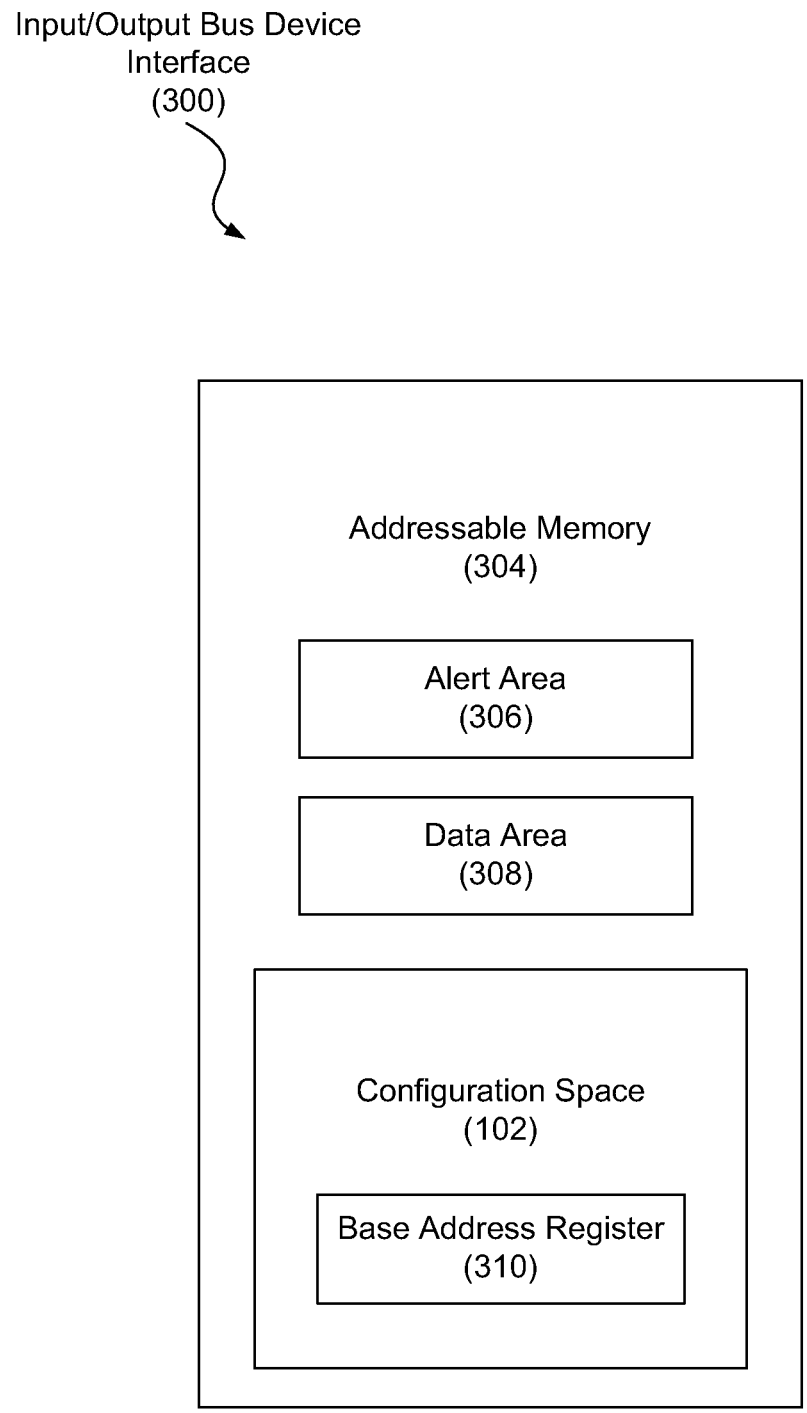
FIG. 3 is a diagram of an illustrative Input/Output (I/O) bus device interface, according to one embodiment of principles described herein.

FIG. 3 is a diagram of an illustrative Input/Output (I/O) bus device interface (300). According to certain illustrative embodiments, an I/O bus device interface (300) may include an addressable memory (304). The addressable memory (304) may include an alert area (306) and a data area (308). The addressable memory may also include a configuration space (302) which may be used to configure the I/O bus device interface (300) including memory addresses that are used to access the addressable memory (304). The configuration space (302) may also include a base address register (310). Some bus systems such as a PCI express bus system are designed with an auto configuration mechanism which allows devices of the bus system to be automatically configured when powered on. This may be done with a configuration space (302). A configuration space (302) may exist within a small section of addressable memory (304) designed to hold information related to the configuration of the device. The configuration space (302) is typically made of a volatile form of memory. Thus, if loses its information when power is disrupted. Upon a system shutdown or restart, the configuration space (302) must be reprogrammed.

The configuration space (302) may be programmed by a Basic Input Output System (BIOS), a piece of firmware, or an operating system upon a system start or restart. Upon a system start, the system may be configured to detect all devices along an I/O bus system. The devices which are found along the bus system may be mapped and configured accordingly. This may be done by programming a number of base address registers (310). The base address registers (310) may also be used to set the addresses used to access the addressable memory.

The addressable memory (304) within the Input/Output bus device interface (300) may be assigned to specific purposes. For example, according to the principles disclosed herein, some memory address space may be designated for management data being transferred between managed and managing processors. Likewise, some memory address space may be designated as an alert area.

Figure 4A:
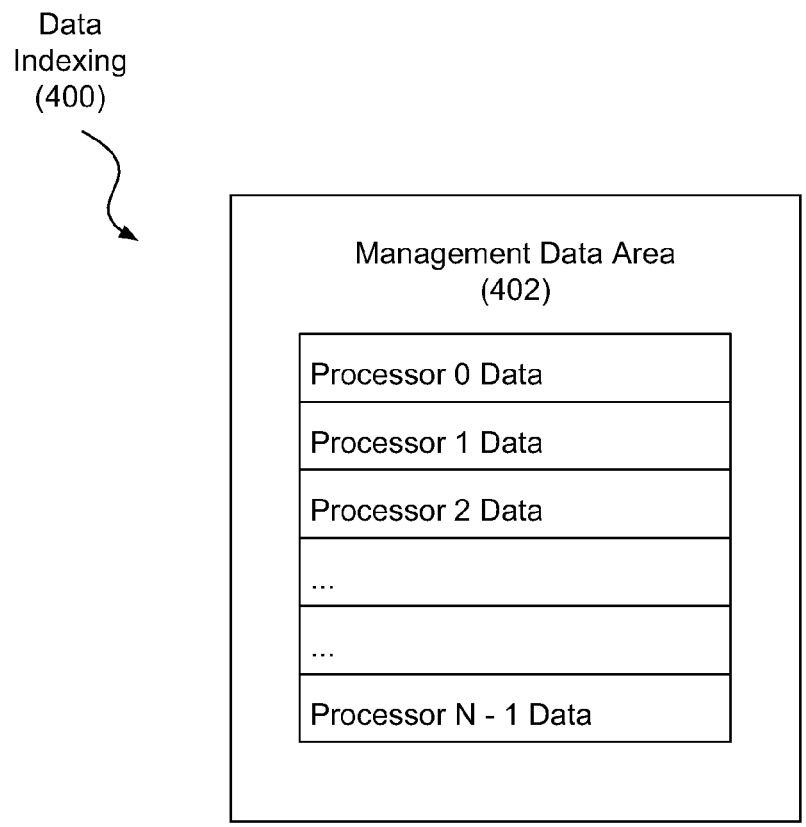
FIG. 4A is a diagram showing illustrative indexing of alert data within a configuration space, according to one embodiment of principles described herein.

FIG. 4A is a diagram showing illustrative indexing (400) of management data within a configuration space. According to certain illustrative embodiments, a specific block of addressable memory (304) within an Input/Output bus device interface (300) may be designated as a management data area (402). The management data area (402) may be used to store management data received from a managed host processor. The managed host processor (202, FIG. 2) may be given the appropriate memory location within the configuration space (302, FIG. 2) in which to place the management data. The managed host processor (202, FIG. 2) may use the existing I/O bus system (230, 232; FIG. 2) to access the addressable memory within the I/O bus device interface on the managing processor (212, FIG. 2).

In some embodiments, a computing system may include multiple managed host processors. In such embodiments, each managed host processor may be given a specific block of memory within the management data area (402) in which to store management data. For example, if a given computing system includes N managed host processors, then the management data area (402) may be divided into N segments. The N segments may be indexed between 0 and N−1. As will be appreciated by one skilled in the relevant art, there may be other ways to index the management data for the multiple host processors of the computing system. A method or system embodying principles described herein may employ any suitable indexing method.

Figure 4B:
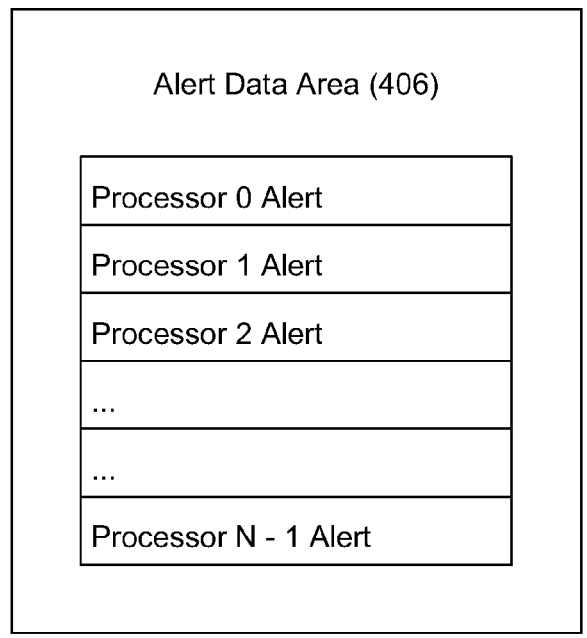
FIG. 4B is a diagram showing illustrative indexing of management date within a configuration space, according to one embodiment of principles described herein.

FIG. 4B is a diagram showing illustrative indexing (404) of alert data within a configuration space (302, FIG. 2). According to certain illustrative embodiments, a specific block of memory within a configuration space (302, FIG. 2) may be designated as alert area (406). The alert area (408) may be designated as a location in which a managed host processor (202, FIG. 2) places a predetermined value to indicate to the managing processor (212, FIG. 2) that newly-provided management data is in a corresponding management data area (402). Doing so will allow the managed host processor to inform the managing processor of a change in state or configuration of the host processor immediately. This function may be referred to as "doorbell" functionality.

When a value is stored in an alert area (406), the managing processor operation is interrupted and if can then examine the corresponding management data area (402). Thus, the managing processor may be informed of changes in the host processor as they occur instead of waiting until the next time the managing processor polls the managed host processor for management data. The alert area (406) may also be indexed in a manner similar to the manner described above for the management data area (402).

Figure 5:
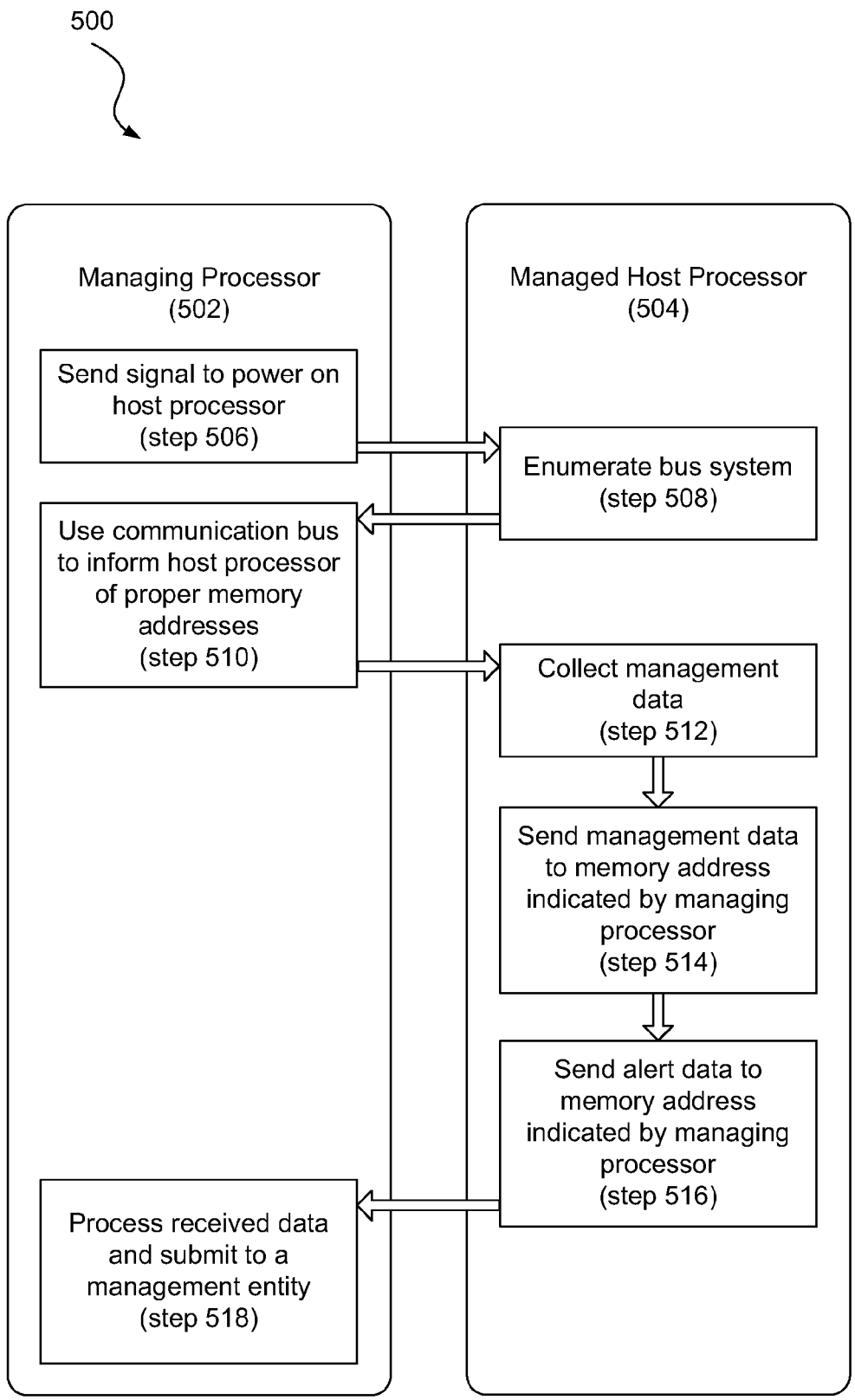
FIG. 5 is a flow chart showing illustrative tasks performed by a managing processor and a managed host processor, according to one embodiment of principles described herein.

FIG. 5 is a flow chart showing illustrative tasks (500) performed by a managing processor (502) and a managed host processor (504). According to certain illustrative embodiments, the managing processor (502) and the managed host processor (504) may perform a set of steps (506, 508, 510) to setup the system to allow for the transfer of management data over an I/O bus system. During normal operation of the processors (502, 504), the managed host processor (504) and the managing processor (502) may repeatedly perform a set of steps (512, 514, 516, 518) to transfer the management data over the I/O bus system.

As mentioned above, a managed host processor (504) may be in a powered down state until needed. When needed, the managing processor (502) may send (step 506) a signal over a power link to power up the managed host processor (504).

Upon power up, a BIOS or firmware system associated with the managed host processor (504) may enumerate (step 508) the bus system. The enumeration process may involve detecting all devices along the bus system and programming the configuration space of certain devices. Particularly, the enumeration process may involve designating a management data area and an alert area, as described above, within the addressable memory of an I/O bus device interface of the managing processor (504).

After the bus system has been enumerated and the configuration space of the managing processor (502) has been properly programmed, the managing processor (502) may use a direct communication bus (224, FIG. 2) to inform (step 510) the managed host processor (504) of important memory locations within the addressable memory of the Input/Output bus device interface (300, FIG. 3) of the managing processor (502). The important memory locations may include the proper memory location in which management data is to be stored and the memory location which has been designated as an alert area. Furthermore, the managing processor (502) may inform the managed host processor (504) procedural information such as what type of management data should be sent and how often.

After the system has been setup to allow the transfer of management data from the managed host processor (504) to the managing processor (502), the actual transfer of management data may take place as determined by the established procedures. The managed host processor (504) may collect (step 512) management data and send (step 514) the management data to the proper memory address in the I/O bus device interface of the managing processor as previously indicated by the managing processor (502) over the I/O communication bus. The managed host processor (504) may then send (step 516) alert data to the proper alert area as indicated by the managing processor (502).

The frequency with which management data is transferred from the managed host processor (504) to the managing processor (502) may vary throughout different embodiments. In some embodiments, the managed host processor (504) may be configured to send management data at regular intervals. Additionally or alternatively, tie managed host processor (504) may send management data in response to a change of state, configuration, or performance. Thus, the managing processor (502) may receive the data soon after the change occurs instead of waiting until the next scheduled interval.

Upon receiving management data at a scheduled interval or as indicated by an alert notification, the managing processor (502) may process (step 518) the data and submit it to a managing entity. The managing entity may use the management data to manage the processing resources of a plurality of computing systems more effectively.

Figure 6:
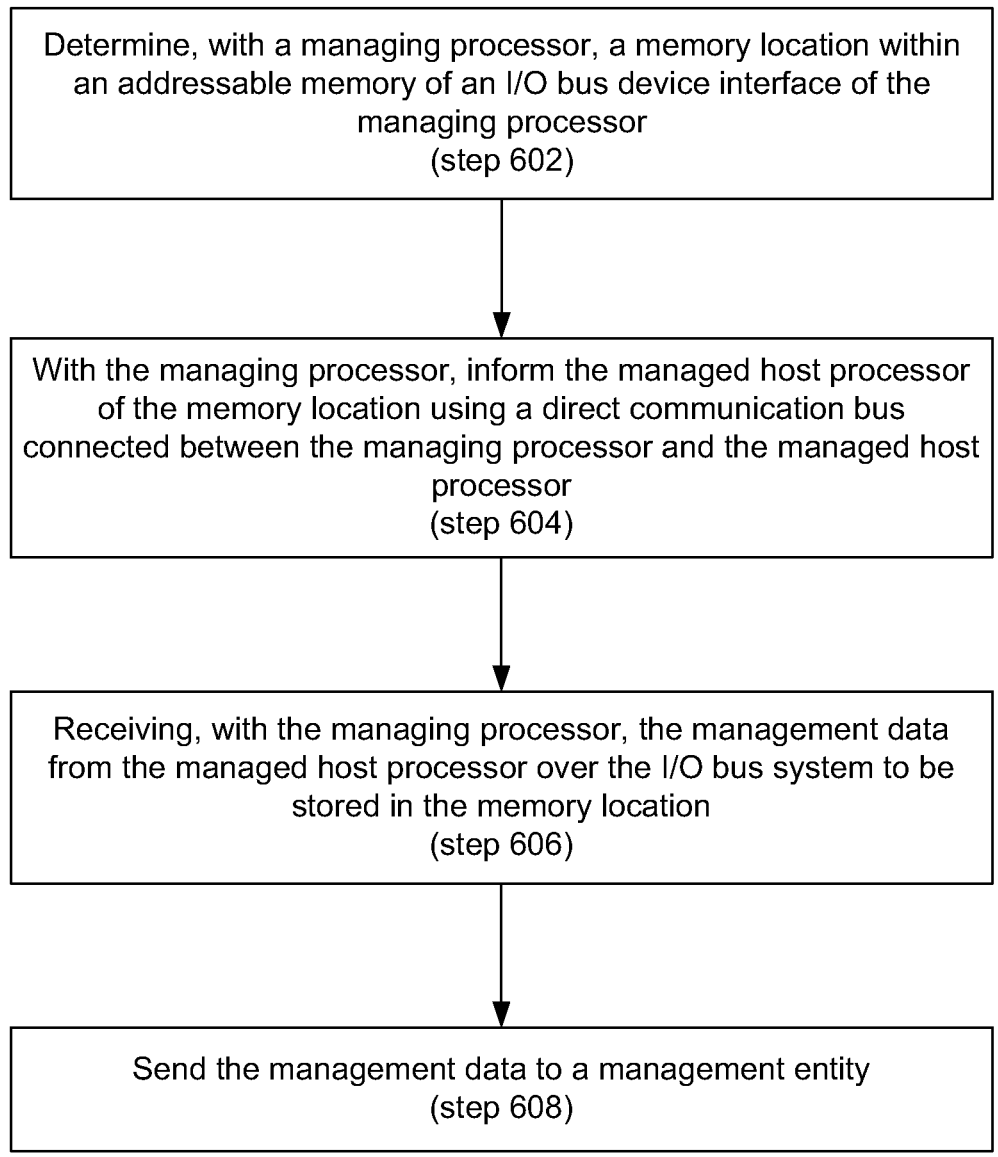
FIG. 6 is a flow chart snowing an illustrative method for transferring management data between two processors, according to one embodiment of principles described herein.

FIG. 6 is a flowchart showing an illustrative method for transferring management data between two processors. According to certain illustrative embodiments, the method (600) may include determining (step 602), with a managing processor, a memory location within an addressable memory of an I/O bus device interface of the managing processor; with the managing processor, informing (step 604) the managed host processor of the memory location using a direct communication bus connected between the managing processor and the managed host processor; and receiving (step 606), with the managing processor, the management data from the managed host processor over the I/O bus system to be stored in the memory location. The method may further include sending (step 608) the management data to a management entity.

In sum, through use of a method or system embodying principles described herein, a managing processor may receive management data from a managed host processor at a rapid rate, allowing the managing processor to have up-to-date management data. This management data may be passed on to a management entity such as a central management system which may be able to effectively use the management data to manage a plurality of computer systems. Additionally, the managing processor need not wait until a scheduled time to receive updated management data. The managed host processor may send data in response to a change of state at any time.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A multi-processor system comprising:
   a managing processor comprising an addressable memory of an I/O bus interface device, the addressable memory comprising:
      a configuration space to detect a number of managed host processors in response to a start up or a shutdown event of the multi-processor system, and to store configuration information for the I/O bus interface device; and
      a base address register to designate a management data area and an alert area in the addressable memory for each managed host processor of the detected number of managed hosts, in which the managing processor:
         controls the power being supplied to at least one managed host processor of the number of managed host processors; and
         manages a flow of data between the number of managed host processors; and
   at least one managed host processor of the number of managed host processors communicatively coupled to said managing processor through an Input/Output (I/O) bus system of said I/O bus system comprising an I/O bus switch;
   in which said managing processor is further to:
      receive management data from said at least one managed host processor of the number of managed host processors through said Input/Output (I/O) bus system; and
      store said management data in the management data area of the addressable memory of the I/O bus interface device of said managing processor; and
      receive in the alert area of the addressable memory of the I/O bus interface device of said managing processor, an alert from said at least one managed host processor of the number of managed host processors indicating that newly provided management data is in a corresponding management data area.

2. The system of claim 1, in which said managing processor is further configured to indicate to said managed host processor along a direct communication bus that is distinct from an I/O bus line of the I/O bus system, a memory location within said addressable memory where said managed host processor should send management data.

3. The system of claim 1, in which said managing processor is further configured to send said management data to a management entity.

4. A method for transferring management data between a managed host processor and a managing processor over an Input/Output (I/O) bus system, the method comprising, with said managing processor:
   detecting a number of managed host processors in response to a start up or a shutdown event;
   storing configuration information for the I/O bus interface device for each managed host processor of the detected number of managed hosts;
   determining a memory location within an addressable memory of an I/O bus device interface of said managing processor;
   determining within said addressable memory:
      an alert area for each managed host processor of the detected number of managed hosts to store alerts indicating that newly-provided management data is available in a corresponding management data area; and
      a management data area for each managed host processor of the detected number of managed hosts to store management data received from each managed host processor;
   informing a managed host processor of the detected number of managed hosts of respective memory locations for the alert area and the management data area using a direct communication bus that is distinct from an I/O bus line of the I/O bus system connected between said managing processor and said managed host processor of the detected number of managed hosts; and
   receiving said management data from said managed host processor of the detected number of managed hosts over the I/O bus line comprising parallel transmission wires to be stored in said memory location, said I/O bus system including a number of I/O bus lines and I/O bus switches.

5. The system of claim 1, in which said managing processor manages multiple managed host processors.

6. The system of claim 1, in which the alert area is to:
   receive a predetermined value to indicate to said managing processor that newly-provided management data is in a corresponding management data area; and
   interrupt said managing processor operation to examine said corresponding management data area.

7. The method of claim 4, further comprising interrupting said managing processor operation when a value stored in an alert area of said addressable memory indicates newly-provided management data is in a corresponding management data area.

8. The system of claim 1, in which said alert area and said data management area are indexed similar to one another based on a number assigned to each of said managed host processors.

9. The system of claim 1, in which:
the managing processor comprises a master bus station to communicatively couple the managing processor to each managed host processor of the detected number of managed hosts via a direct communication bus that is distinct from an I/O bus line; and
the at least one managed host processor of the number of managed host processors comprises:
- a slave bus station to communicatively couple each managed host processor of the detected number of managed hosts to the managing processor via a direct communication bus that is distinct from the I/O bus line; and
- a root complex that communicatively couples each managed host processor of the detected number of managed hosts to the I/O bus interface device.

* * * * *